(12) United States Patent
Herbach et al.

(10) Patent No.: US 9,707,966 B2
(45) Date of Patent: Jul. 18, 2017

(54) METHODS AND SYSTEMS FOR DETERMINING INSTRUCTIONS FOR PULLING OVER AN AUTONOMOUS VEHICLE

(71) Applicant: Waymo LLC, Mountain View, CA (US)

(72) Inventors: Joshua Seth Herbach, San Francisco, CA (US); Nathaniel Fairfield, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/347,389

(22) Filed: Nov. 9, 2016

(65) Prior Publication Data

US 2017/0057510 A1    Mar. 2, 2017

Related U.S. Application Data

(63) Continuation of application No. 13/940,429, filed on Jul. 12, 2013, now Pat. No. 9,523,984.

(51) Int. Cl.
*G01C 22/00* (2006.01)
*B60W 30/18* (2012.01)
(Continued)

(52) U.S. Cl.
CPC .......... *B60W 30/181* (2013.01); *B60W 10/18* (2013.01); *B60W 10/20* (2013.01);
(Continued)

(58) Field of Classification Search
CPC .... B60W 30/181; B60W 10/18; B60W 10/20; B60W 30/09; B60W 30/18009
USPC ............................................. 701/23, 28, 17
See application file for complete search history.

(56) References Cited

U.S. PATENT DOCUMENTS 3,623,100 A    11/1971   Rapp
5,249,126 A    9/1993    Hattori
(Continued)

FOREIGN PATENT DOCUMENTS

DE    102010030486    12/2011
JP    2012250612      12/2012
KR    2010069452      6/2010

*Primary Examiner* — Muhammad Shafi
(74) *Attorney, Agent, or Firm* — McDonnell Boehnen Hulbert & Berghoff LLP

(57) ABSTRACT

Methods and systems for determining instructions for pulling over an autonomous vehicle are described. An example method may involve identifying a region of a road ahead of the autonomous vehicle based on lane boundaries of the road, one or more road boundaries indicating an edge of the road, and a size of the autonomous vehicle. The method may also involve determining a braking profile for reducing the speed of the autonomous vehicle based on the region and a speed of the autonomous vehicle. The method may also involve determining, based on the braking profile, a trajectory such that the autonomous vehicle will travel within the region while reducing the speed of the autonomous vehicle. The method may further involve determining instructions for pulling over and stopping the autonomous vehicle in the region in accordance with the determined trajectory and storing the instructions in a memory accessible by a computing device.

20 Claims, 7 Drawing Sheets

(51) Int. Cl.
*B62D 15/02* (2006.01)
*B60W 10/18* (2012.01)
*B60W 10/20* (2006.01)
*B60W 30/09* (2012.01)
*B60W 50/02* (2012.01)
*G05D 1/00* (2006.01)

(52) U.S. Cl.
CPC ...... *B60W 30/09* (2013.01); *B60W 30/18009* (2013.01); *B60W 50/0225* (2013.01); *B62D 15/025* (2013.01); *B62D 15/0265* (2013.01); *G05D 1/0088* (2013.01); *B60W 2550/00* (2013.01); *B60W 2550/10* (2013.01); *B60W 2710/18* (2013.01); *B60W 2710/20* (2013.01)

(56) References Cited

U.S. PATENT DOCUMENTS

| | | | | |
|---|---|---|---|---|
| 5,414,625 A | * | 5/1995 | Hattori | G05D 1/0246 180/169 |
| 2006/0142922 A1 | * | 6/2006 | Ozaki | B60T 8/17557 701/70 |
| 2007/0265540 A1 | * | 11/2007 | Fuwamoto | A61B 5/04525 600/515 |
| 2007/0291130 A1 | * | 12/2007 | Broggi | G01S 17/023 348/218.1 |
| 2008/0091309 A1 | | 4/2008 | Walker | |
| 2008/0285799 A1 | * | 11/2008 | Chiu | G06K 9/00805 382/103 |
| 2009/0187304 A1 | * | 7/2009 | Waypa | G07C 5/0816 701/33.4 |
| 2010/0217527 A1 | * | 8/2010 | Hattori | B60T 7/22 701/301 |
| 2011/0215947 A1 | | 9/2011 | Ekmark et al. | |
| 2012/0083960 A1 | | 4/2012 | Zhu et al. | |
| 2013/0147638 A1 | * | 6/2013 | Ricci | G06F 9/54 340/905 |
| 2013/0314503 A1 | * | 11/2013 | Nix | G06K 9/00805 348/46 |

\* cited by examiner

COMPUTER PROGRAM PRODUCT 600

SIGNAL BEARING MEDIUM 601

PROGRAM INSTRUCTIONS 602

- IDENTIFYING A REGION OF A ROAD AHEAD OF AN AUTONOMOUS VEHICLE IN WHICH TO PULL OVER AND STOP THE AUTONOMOUS VEHICLE BASED ON LANE BOUNDARIES OF THE ROAD, ONE OR MORE ROAD BOUNDARIES INDICATING AN EDGE OF THE ROAD, AND A SIZE OF THE AUTONOMOUS VEHICLE

- BASED ON A SPEED OF THE AUTONOMOUS VEHICLE AND BASED ON THE REGION, DETERMINING A BRAKING PROFILE FOR REDUCING THE SPEED OF THE AUTONOMOUS VEHICLE WHILE TRAVELLING WITHIN THE REGION

- BASED ON THE BRAKING PROFILE, DETERMINING A TRAJECTORY SUCH THAT THE AUTONOMOUS VEHICLE WILL TRAVEL WITHIN THE REGION WHILE REDUCING THE SPEED OF THE AUTONOMOUS VEHICLE

- DETERMINING, BY A COMPUTING DEVICE THAT IS CONFIGURED TO CONTROL THE AUTONOMOUS VEHICLE, INSTRUCTIONS FOR PULLING OVER AND STOPPING THE AUTONOMOUS VEHICLE IN THE REGION IN ACCORDANCE WITH THE DETERMINED TRAJECTORY

- STORING THE INSTRUCTIONS IN A MEMORY ACCESSIBLE BY THE COMPUTING DEVICE

| COMPUTER READABLE MEDIUM 603 | COMPUTER RECORDABLE MEDIUM 604 | COMMUNICATIONS MEDIUM 605 |

METHODS AND SYSTEMS FOR DETERMINING INSTRUCTIONS FOR PULLING OVER AN AUTONOMOUS VEHICLE

CROSS-REFERENCE TO RELATED APPLICATION

The present application is a continuation of U.S. patent application Ser. No. 13/940,429, filed on Jul. 12, 2013, and entitled "Methods and Systems for Determining Instructions for Pulling Over an Autonomous Vehicle," which is herein incorporated by reference as if fully set forth in this description.

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to pulling over an autonomous vehicle. In one aspect, the present application describes a method. The method may comprise identifying a region of a road ahead of an autonomous vehicle in which to pull over and stop the autonomous vehicle based on lane boundaries of the road, one or more road boundaries indicating an edge of the road, and a size of the autonomous vehicle. The method may also comprise based on a speed of the autonomous vehicle and based on the region, determining a braking profile for reducing the speed of the autonomous vehicle while travelling within the region. The method may also comprise based on the braking profile, determining a trajectory such that the autonomous vehicle will travel within the region while reducing the speed of the autonomous vehicle. The method may also comprise determining, by a computing device that is configured to control the autonomous vehicle, instructions for pulling over and stopping the autonomous vehicle in the region in accordance with the determined trajectory. The method may further comprise storing the instructions in a memory accessible by the computing device.

In another aspect, the present application describes a non-transitory computer readable medium having stored thereon executable instructions that, upon execution by a computing device, cause the computing device to perform functions. The functions may comprise identifying a region of a road ahead of an autonomous vehicle in which to pull over and stop the autonomous vehicle based on lane boundaries of the road, one or more road boundaries indicating an edge of the road, and a size of the autonomous vehicle. The functions may also comprise based on a speed of the autonomous vehicle and based on the region, determining a braking profile for reducing the speed of the autonomous vehicle within the region, the braking profile comprising a pre-maneuver phase for reducing the speed of the autonomous vehicle at a first rate, a maneuver phase for reducing the speed of the autonomous vehicle at a second rate, and a post-maneuver phase for reducing the speed of the autonomous vehicle at a third rate until the autonomous vehicle is stopped in the region. The functions may also comprise based on the braking profile, determining a trajectory such that the autonomous vehicle will travel within the region while reducing the speed of the autonomous vehicle. The functions may also comprise determining instructions for pulling over and stopping the autonomous vehicle in the region in accordance with the determined trajectory. The functions may further comprise storing the instructions for pulling over and stopping the autonomous vehicle.

In still another aspect, the present application describes a system. The system may comprise at least one processor. The system also may comprise a memory having stored thereon instructions that, upon execution by the at least one processor, cause the system to perform functions. The functions may comprise identifying a region of a road ahead of an autonomous vehicle in which to pull over and stop the autonomous vehicle based on lane boundaries of the road, one or more road boundaries indicating an edge of the road, and a size of the autonomous vehicle. The functions may also comprise based on a speed of the autonomous vehicle and based on the region, determining a braking profile for reducing the speed of the autonomous vehicle while travelling within the region. The functions may also comprise based on the braking profile, determining a trajectory such that the autonomous vehicle will travel within the region while reducing the speed of the autonomous vehicle. The functions may also comprise determining instructions for pulling over and stopping the autonomous vehicle in the region in accordance with the determined trajectory. The functions may further comprise storing the instructions in the memory accessible and executable by the at least one processor so as to enable the system to control the autonomous vehicle.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 6 is a schematic diagram illustrating a conceptual partial view of an example computer program.

DETAILED DESCRIPTION

Figure 1:
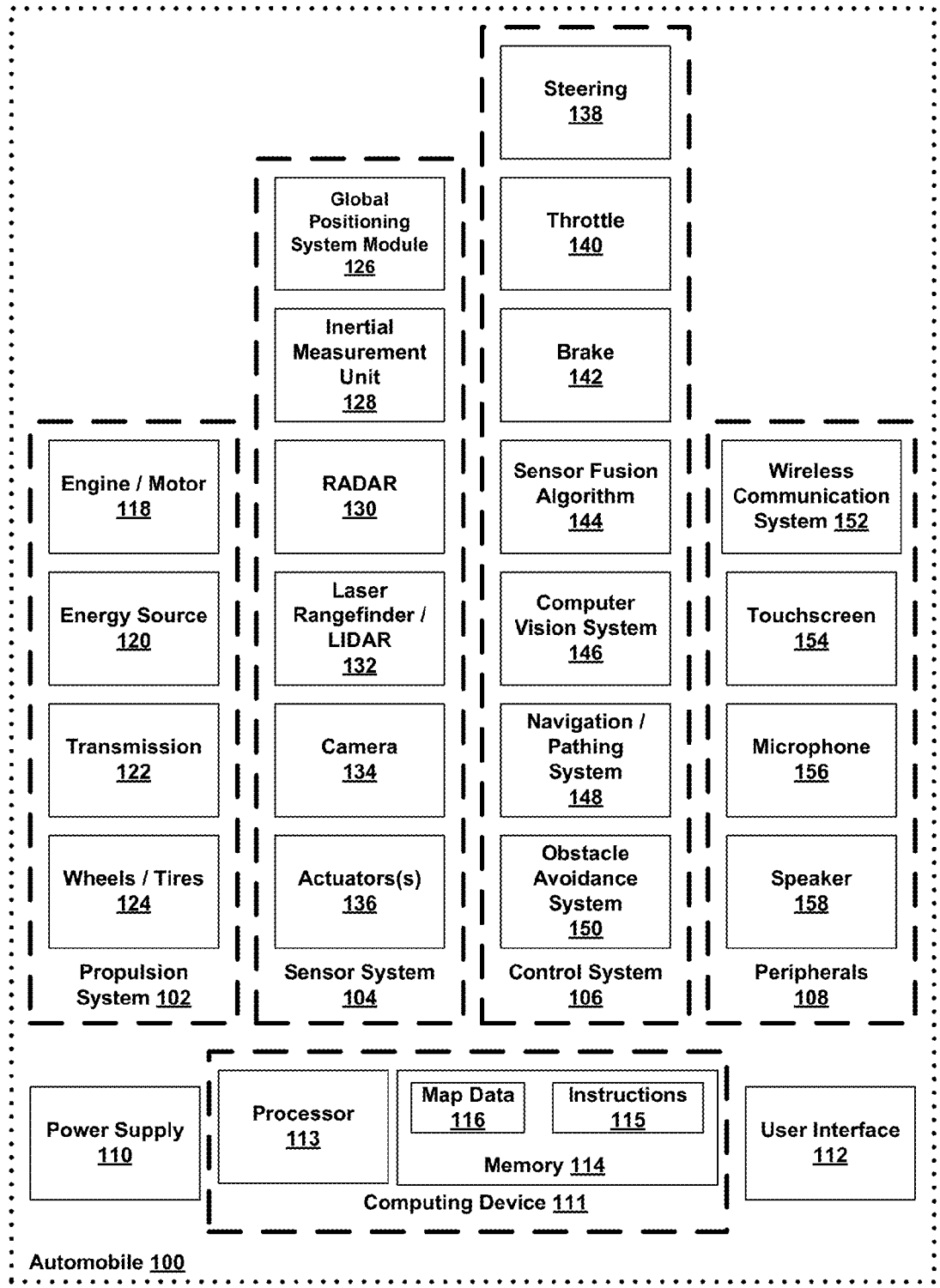
FIG. 1 is a simplified block diagram of an example automobile.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road or path of travel may be configured to identify regions of the road or path in which the autonomous vehicle can pull over and stop. Further, the autonomous vehicle may be configured to periodically identify such regions as it travels so that in an emergency scenario the autonomous vehicle can quickly find a region in which to pull over.

In general, the autonomous vehicle may be looking for a safe space on or alongside the road to pull over. Some roads, such as those on bridges or those with obstructions in their shoulder lanes, may not be suitable or safe for pulling over the autonomous vehicle. As such, the autonomous vehicle may ideally look for a continuous shoulder or region of a road that is free of obstacles and otherwise suitable for pulling over.

The autonomous vehicle, or a computing device associated with the autonomous vehicle, may monitor a road ahead in order to identify a region for pulling over the autonomous vehicle. For example, at a given moment, the autonomous vehicle may monitor a section of the road that it will be driving through over the next ten seconds or other period of time following the given moment. The autonomous vehicle may use a variety of methods to determine whether the section of the road (e.g., the identified region) is safe or otherwise suitable for pulling over the autonomous vehicle. If the autonomous vehicle determines that the section of the road is not safe or not otherwise suitable for pulling over the autonomous vehicle, the autonomous vehicle may continue driving along its normal path and monitor a different section of the road that is further ahead of the previous section.

The autonomous vehicle may be configured to detect objects ahead of the autonomous vehicle on the road in the region, such as moving vehicles, parked vehicles, traffic cones, and other objects, both static and dynamic. The autonomous vehicle may also be configured to detect types of lane and road boundaries (e.g., road surface markings, curbs, physical barriers) in the region. Further, the autonomous vehicle may determine if such objects would prevent the autonomous vehicle from pulling over in the region, or if the autonomous vehicle can adjust its trajectory in order to pull over while avoiding such objects. The autonomous vehicle may also utilize map data associated with the road, and the map data may include information about the objects, the lane boundaries, and the road boundaries, among other information.

Once a region is identified and determined to be suitable for pulling over the autonomous vehicle, the autonomous vehicle may determine a braking profile to employ in order to bring the autonomous vehicle's speed down to zero within the region. The braking profile may include multiple phases, and during each phase the autonomous vehicle may reduce its speed at a respective rate while travelling within the region. In addition to reducing the speed of the autonomous vehicle, the autonomous vehicle may likely have to move laterally toward a point within the region that the autonomous vehicle will come to a stop. Since a sharp lateral movement while the autonomous vehicle is braking heavily (e.g., a high rate of deceleration) can lead to control and stability issues, the braking profile may include lower rates of deceleration for phases during which the autonomous vehicle is undergoing the majority (or substantially all) of the lateral movement required to pull over the autonomous vehicle. The braking profile may take other forms as well.

In an example method for pulling over the autonomous vehicle, the autonomous vehicle may determine an adjusted trajectory based on the braking profile. The adjusted trajectory may include a route or path for the autonomous vehicle to travel within the identified region in order to pull over. Moreover, the adjusted trajectory may be determined such that the autonomous vehicle can navigate to avoid static and/or dynamic objects within the identified region and, in some examples, avoid static and/or dynamic objects before the autonomous vehicle reaches the identified region. After determining the adjusted trajectory, the autonomous vehicle may store in memory instructions for pulling over in accordance with the identified region, the braking profile, and the adjusted trajectory.

The autonomous vehicle may be configured to periodically or continuously identify safe regions for pullover, determine corresponding braking profiles and adjusted trajectories, and store respective instructions for pulling over in each identified safe region. If the autonomous vehicle does not execute the instructions to pull over, it may continue driving along its current trajectory. When the autonomous vehicle executes the instructions to pull over, it may switch from its current trajectory to the adjusted trajectory. The execution of the instructions may be automated, such as in an event in which the autonomous vehicle detects an emergency scenario (e.g., sensor failure, empty gas tank, etc.) and responsively pulls itself over. In other events, including emergency scenarios, a driver or remote operator of the autonomous vehicle can manually provide a command to execute the instructions to pull over the autonomous vehicle. In still other events, the driver can disengage automated driving and manually pull the autonomous vehicle over as well.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of a non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an O2 monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
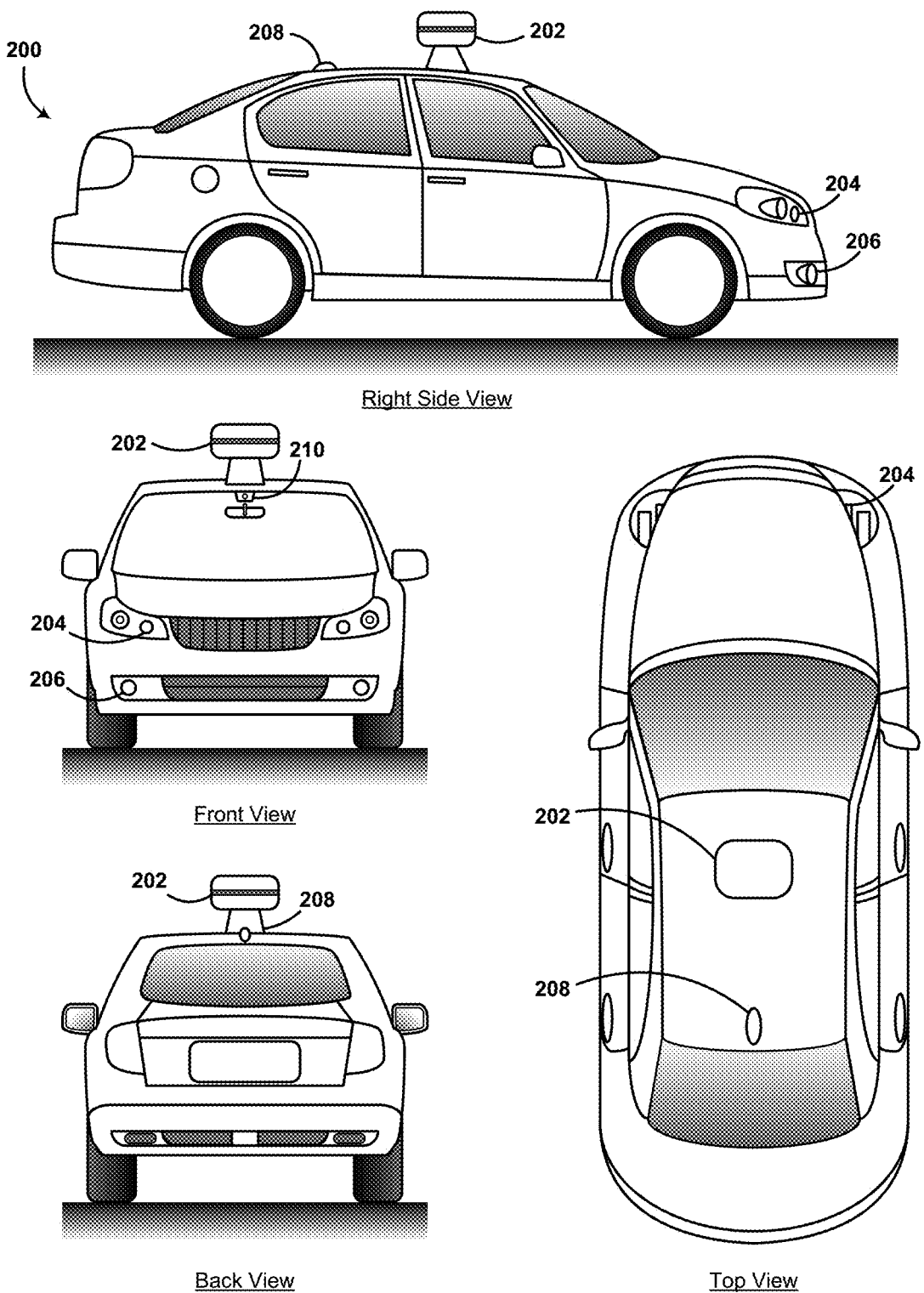
FIG. 2 illustrates an example automobile.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
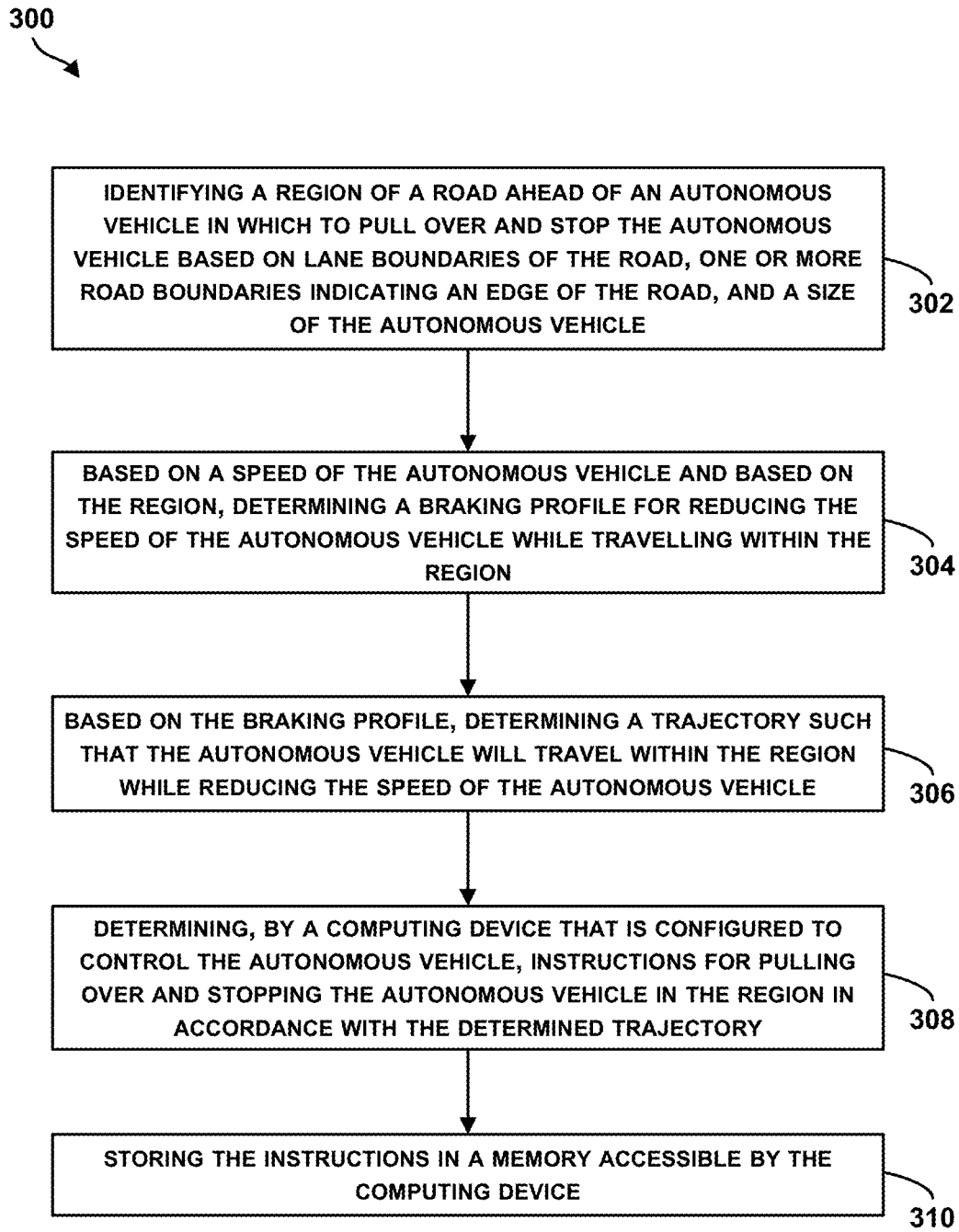
FIG. 3 is a flow chart of an example method for pulling over an autonomous vehicle.

FIG. 3 is a flow chart of an example method 300 for adjusting a speed of a vehicle. The method 300 may include one or more operations, functions, or actions as illustrated by one or more of blocks 302-308. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process. For the sake of example, the method 300 shown in FIG. 3 will be described as implemented by an example computing device, such as the computing device 111 in FIG. 1. The method 300 can also be described as implemented by an autonomous vehicle, as the computing device may be onboard the vehicle or may be off-board but in wireless communication with the vehicle. Therefore the terms "computing device" and "autonomous vehicle" can be interchangeable herein. However, in some examples, the computing device may be configured to control the vehicle in an autonomous or semi-autonomous operation mode. It should be understood that other entities or combinations of entities can implement one or more steps of the example method 300.

At block 302, the method 300 includes identifying a region of a road ahead of an autonomous vehicle in which to pull over and stop the autonomous vehicle based on lane boundaries of the road, one or more road boundaries indicating an edge of the road, and a size of the autonomous vehicle. As the autonomous vehicle travels, the computing device may be configured to periodically identify regions of interest (e.g., every 100 milliseconds). The regions of interest may include multiple regions ahead of the autonomous vehicle and to the left and/or right of the autonomous vehicle. In some embodiments, the computing device may gather a list of regions and then analyze the regions to determine a region that is most safe or otherwise preferable for pulling over the autonomous vehicle. For example, the computing device may pull over the autonomous vehicle in the closest safe region rather than a farther region, depending on the urgency of the pullover. Other examples are also possible, and a variety of factors may determine which region out of multiple safe regions to pull over in, aside from the urgency of the pullover.

Further, a given region may be identified based on its distance from the autonomous vehicle and/or based on how soon the autonomous vehicle will enter the given region as the autonomous vehicle continues along its current trajectory. For example, at a given point in time and at a given location on the road, a region of interest may be a section of the road that the autonomous vehicle will be driving over during the next ten seconds following the given point in time. Other examples are also possible.

In some embodiments, the computing device identifying the region may comprise the computing device referring to a predetermined map stored in memory either locally at the computing device or remotely at another computing device (and/or the computing device dynamically building a map of the road ahead of the autonomous vehicle). The roads, paths, and other drivable areas of the dynamic map and/or the predetermined map may include labels for identified lanes, lane boundaries, road boundaries, and connections between lanes (e.g., which lanes can feed into other adjacent lanes). Such labels may include information indicating types of lanes of the road (e.g., traffic lane, passing lane, emergency lane, turning lane, bus lane, etc.), types of lane boundaries (e.g., white lines, yellow lines, other road surface markings and/or mechanical markings, etc.), types of road boundaries (e.g., regular curbs, red curbs, sidewalks, guard rails, other barriers, etc.) road intersections, one or more obstacles ahead of the autonomous vehicle, and other information about the road or areas adjacent to the road.

In some embodiments, the respective identified regions ahead of the autonomous vehicle may have an associated priority and/or quality score. For example, a quality and/or priority determined by the computing device may indicate to the computing device that a suitable region for pullover that is farther ahead of the autonomous vehicle is more suitable for pullover than another suitable region that is closer to the autonomous vehicle. Further, the pullover region that is farther away may have more pullover space than the closer region, and there may not be an immediate need to pullover (e.g., no emergency scenario). Alternatively, the computing device may pull over the autonomous vehicle in the suitable closer region with the lower quality score and/or priority if an emergency scenario is detected. Other examples are also possible.

In some scenarios, the computing device may be configured to filter out and disregard information from the map data. In such scenarios, the computing device may not consider certain regions as safe for pulling over the autonomous vehicle. For example, regions where a lane's boundary is marked as red or blue, or the lane is labeled as a "no parking" lane, may be ignored by the computing device. Other examples are also possible. However, it should be understood that in certain emergency scenarios, the computing device may be configured to pull over the autonomous vehicle in ignored regions if a pullover is necessary or required. Further, in general, the computing device may be configured to pull over the autonomous vehicle in regions that have been identified, but deemed unsafe or unsatisfactory for pullover by the computing device, such as regions that may have space for the autonomous vehicle to pullover and park, but are labeled as "no parking zones."

In some embodiments, the computing device identifying the region may comprise the computing device utilizing the predetermined map data. Namely, the computing device may take identified regions of interest from the predetermined map and divide the regions into smaller "chunks" of similar or varying length, while the width of the chunks may be the same as the width of the road (e.g., from a leftmost road boundary to a rightmost road boundary) or may be a longer width. For example, each region may be divided into chunks of 50 centimeters in length. As another example, each region may be divided into chunks of 1 meter in length. In other examples, each region may be small enough in size where they do not need to be divided into chunks. Other examples are also possible.

The computing device may then apply one or more methods/algorithms to each chunk to determine if the given chunk and/or the respective region that the given chunk is in are safe or otherwise ideal for pullover. One example method/algorithm may include the computing device first identifying the rightmost lane ($L\_r$). The computing device may then obtain, from the predetermined map data, a set of road and lane boundaries (and possibly other boundaries), and identify the boundaries to the right of L r. The computing device may then search through the boundaries in order to identify the rightmost boundary ($B\_l$) which can be considered the edge of $L\_r$. For example, if there is a bike lane to the right of $L\_r$, the computing device may be configured to identify the left edge of the bike lane as $B\_l$. The computing device may also search through the boundaries in order to identify the rightmost boundary which can be considered the edge of the road ($B\_e$). After identifying $B\_l$ and $B\_e$, the computing device may then determine the lateral distance from the center of $L\_r$ to $B\_l$ ($D\_l$), and the lateral distance from the center of $L\_r$ to $B\_e$ ($D\_e$). Further, if Dl plus the width of the autonomous vehicle (w) plus a threshold distance ($T\_p$) is less than $D\_e$, the computing device may determine that the given chunk is safe or otherwise suitable to pull over the autonomous vehicle at that given chunk of the respective region. In other words, this result indicates that the edge of the road is further from the rightmost lane than the width of the car plus a buffer distance ($T\_p$). Alternatively, if $D\_l$ plus w plus $T\_p$ is greater than $D\_e$, the computing device may determine that the given chunk is not safe or otherwise not suitable to pull over the autonomous vehicle at that given chunk of the respective region.

In some embodiments, the threshold distance, $T\_p$ may be a constant value used in many or all pullover scenarios. Alternatively, in other embodiments, $T\_p$ may vary per scenario based on one or more factors including the predetermined map data, types of boundaries on the road, and other factors, some being associated with autonomous vehicle's surrounding environment. For example, a width of the road may determine a value for $T\_p$. When streets are narrow, $T\_p$ may be larger so that when the autonomous vehicle pulls over and parks, it may not block passing traffic. In general, a positive value for $T\_p$ may require a wider region for pulling over the autonomous vehicle, which may also allow for less precise predetermined map data. As another example, a speed limit of the road may determine a value for $T\_p$. In low speed areas, such as on residential streets, T p may have a negative value, which would allow the autonomous vehicle to pull over while leaving a portion of the vehicle in the road. Further on residential streets, for instance, the autonomous vehicle may be able to pull over safely while still leaving room for passing traffic. As yet another example, road surface markings may determine a value for $T\_p$. When curbs are marked as loading zones, for instance, $T\_p$ may have a negative value (e.g., a negative value as much as the width of the autonomous vehicle, −w). As still another example, $T\_p$ may have a value of zero for some roads, in which case the given chunk may be considered viable for pullover if, after pulling over the autonomous vehicle to the side of the road, no portion of the car would be left in the road. Many other factors are possible as well for determining a value of $T\_p$.

In some embodiments, different known regions of a road indicated by predetermined map data may each have a respective predetermined $T\_p$ included in memory and associated with the predetermined map data. Additionally or alternatively, in other embodiments, the computing device may determine $T\_p$ for a particular region after identifying the particular region using live sensor data.

In some embodiments, the computing device may determine $T\_p$ by use of a decision tree or decision forest. Moreover, $T\_p$ may have an initial value, and the computing device may run though a decision tree in order to add or subtract from the initial value. For example, the initial value of $T\_p$ may be zero, and the computing device may first check a region of the road for its speed limit. If the speed limit exceeds a certain threshold (e.g., 45 mph), a value may be added to $T\_p$ (e.g., +1.0 meters). If the speed limit is below a certain threshold (e.g., 15 mph), a value may be subtracted from $T\_p$ (e.g., −0.5 meters). Next, the computing device may determine if D l is greater or less than one or more thresholds. Third, the computing device may then check if the region includes a loading zone or other special type of zone. The computing device may then determine other factors/values as well, and adjust $T\_p$ accordingly. It should be understood that other examples of decision trees/forests are possible as well and not limited to the aforementioned example.

In some embodiments, the computing device may also be configured to pull over the autonomous vehicle to the left of the road rather than the right. In such embodiments, an algorithm may be utilized that is similar to the algorithm described above. For example, instead of searching for and identifying rightmost boundaries, the computing device may be configured to search for and identify leftmost boundaries. Additionally, the computing device may be configured to search for any road marking, physical barrier, etc. that separates the leftmost lane from oncoming traffic, instead of searching for and identifying an edge of the road. Other examples are also possible.

In some embodiments, the computing device may be configured to take chunks from one region that have been identified as safe chunks and combine them with safe chunks from another region. In other embodiments, instead of the computing device first identifying regions of interest and then dividing them into chunks, the computing device may be configured to identify smaller chunks (e.g., smaller regions) individually as it drives. In still other embodiments, chunks that include portions of a bridge or other road structure may not be considered viable for pullover if there is no place to park without blocking traffic.

In some embodiments, the computing device identifying the region may be based on an identification of one or more objects ahead of the autonomous vehicle on the road. Additionally or alternatively to identifying objects ahead of (or substantially in front of) the autonomous vehicle (e.g., in substantially the same lane as the autonomous vehicle or an adjacent lane), the computing device can be configured to identify other objects within an environment of the autonomous vehicle, including objects to the left and right of the autonomous vehicle (e.g., adjacent lanes on a road), and/or behind the autonomous vehicle, for example (e.g., such as another vehicle travelling behind the autonomous vehicle that may be ready to pass the autonomous vehicle and perhaps enter the identified region(s)). The computing device may also be configured to identify objects near and/or adjacent to the road as well, such as buildings, fire hydrants, or other objects at or beyond the road boundaries. The objects may be within a longitudinal distance threshold from the autonomous vehicle and/or within a lateral distance threshold from the autonomous vehicle.

The one or more objects may include pedestrians, traffic control objects (e.g., stop signs, traffic cones, traffic lights), construction equipment, buildings, vehicles (e.g., cars, trucks, bicycles), and other objects. In addition to identifying the objects, the computing device may be configured to determine respective characteristics of each object. For example, the computing device may be configured to determine a type of an object or classify the object (e.g., car or truck, car or motorcycle, traffic sign or a pedestrian, etc.). Further, the computing device can determine whether the object is moving or stationary (e.g., a parked car).

The computing device may be configured to estimate a size (e.g., width and length) and weight of the object. Further, the computing device may be configured to determine a direction of motion of the object, such as if the object is moving towards the autonomous vehicle or away from the vehicle. Still further, the computing device may be configured to determine a transmission type (e.g., manual and automatic) and transmission mode of the object, such as whether the object is in park, drive, reverse, or neutral transmission mode. Yet still further, the computing device may be configured to determine a position of the object in a respective lane on the road or path of travel, and how close the object may be to lane boundaries. In some examples, the computing device may be configured to determine relative longitudinal speed and lateral speed of the object with respect to the autonomous vehicle. These characteristics are examples, and other characteristics can be determined as well.

To identify the objects and characteristics of the objects, as well as other information associated with the autonomous vehicle's environment, the computing device may be configured to use the sensors and devices coupled to the autonomous vehicle, which may include sensors and modules used in the navigation and pathing system 148 in FIG. 1, as described above. Object data and other environmental data obtained from the autonomous vehicle's sensors may include information associated with live lane and road boundaries. The live boundaries may be similar to those encoded in the predetermined map, but the object data from the sensor(s) may take into account any changes in the environment between the construction of the predetermined map and the present time.

In some embodiments, after obtaining sensor data for a given region ahead of the autonomous vehicle, the computing device may be configured to run one or more algorithms over the given region in order to determine whether they are safe for pullover. The one or more algorithms may be the same as the methods/algorithms described above with respect to the chunks of the given region. Alternatively, the one or more algorithms may be a modified version of the methods/algorithms described above, and information regarding the given region as obtained by the sensor data may take precedence over information regarding the given region from the predetermined map data. For example, more conservative boundaries may be utilized with a modified algorithm (e.g., live sensor data may detect a road boundary to be closer to the autonomous vehicle than the predetermined map indicated the road boundary to be). Further, certain identified objects in the given region may effectively act as additional road edge boundaries. For example, if an object to the right of the autonomous vehicle is closer to the center of the autonomous vehicle's lane than a rightmost road boundary, the left edge of the object may serve as the rightmost road boundary instead the rightmost edge of the road. Other examples are also possible.

Sensor data may include data obtained, for example, from a camera, such as the camera 134 in FIG. 1 or the camera 210 in FIG. 2 or any other image-capture device, may be coupled to the autonomous vehicle and may be in communication with the computing device. The camera may be configured to capture images or a video of the path/road of travel and vicinity of the path/road of travel. The computing device may be configured to receive the images or video and identify, using image processing techniques for example, objects depicted in the image or the video. The computing device may be configured compare portions of the images to templates of objects to identify the objects, for example.

In another example, the computing device may be configured to receive, from a LIDAR device (e.g., the LIDAR unit 132 in FIG. 1) coupled to the autonomous vehicle and in communication with the computing device, LIDAR-based information that may include a three-dimensional (3D) point cloud. The 3D point cloud may include points corresponding to light emitted from the LIDAR device and reflected from objects on the road or in the vicinity of the road.

As described with respect to the LIDAR unit 132 in FIG. 1, operation of the LIDAR device may involve an optical remote sensing technology that enables measuring properties of scattered light to find range and/or other information of a distant target. The LIDAR device, for example, may be configured to emit laser pulses as a beam, and scan the beam to generate two dimensional or three dimensional range matrices. In an example, the range matrices may be used to determine distance to an object or surface by measuring time delay between transmission of a pulse and detection of a respective reflected signal.

In examples, the LIDAR device may be configured to scan an environment surrounding the autonomous vehicle in three dimensions. In some examples, more than one LIDAR device may be coupled to the vehicle to scan a complete 360° horizon of the vehicle. The LIDAR device may be configured to provide to the computing device a cloud of point data representing obstacles or objects, which have been hit by the laser, on the road and the vicinity of the road. The points may be represented by the LIDAR device in terms of azimuth and elevation angles, in addition to range, which can be converted to (X, Y, Z) point data relative to a local coordinate frame attached to the autonomous vehicle. Additionally, the LIDAR device may be configured to provide to the computing device intensity values of the light or laser reflected off the obstacles that may be indicative of a surface type of a given object. Based on such information, the computing device may be configured to identify the objects and characteristics of the objects such as type of the object, size, speed, whether the object is a traffic sign with a retroreflective surface, etc.

In still another example, the computing device may be configured to receive, from a RADAR device (e.g., the RADAR unit 130 in FIG. 1) coupled to the autonomous vehicle and in communication with the computing device, RADAR-based information relating to location and characteristics of the objects. The RADAR device may be configured to emit radio waves and receive back the emitted radio waves that bounced off the surface of objects on the road and in the vicinity of the road. The received signals or RADAR-based information may be indicative, for example, of dimensional characteristics of a given object, and may indicate whether the given object is stationary or moving.

In one example, the computing device may be configured to detect and identify the objects and characteristics of the objects based on information received from multiple sources such as the image-capture device, the LIDAR device, the RADAR device, etc. However, in another example, the computing device may be configured to identify the objects based on information received from a subset of the multiple sources. For example, images captured by the image-capture device may be blurred due to a malfunction of the image-capture device, and in another example, details of the road may be obscured in the images because of fog. In these examples, the computing device may be configured to identify the objects based on information received from the LIDAR and/or RADAR units and may be configured to disregard the information received from the image-capture device.

In another example, the autonomous vehicle may be travelling in a portion of the road where some electric noise or jamming signals may cause the LIDAR device and/or RADAR device to operate incorrectly. In this case, the computing device may be configured to identify the objects based on information received from the image-capture device, and may be configured to disregard the information received from the LIDAR and/or RADAR units. In yet another example, the computing device may be configured to rank these sources of information based on a condition of the road (e.g., fog, electronic jamming, etc.). The ranking may be indicative of which device(s) to rely on or give more weight to in identifying the objects. For instance, if fog is present in a portion of the road, then the LIDAR and RADAR devices may be ranked higher than the image-based device, and information received from the LIDAR and/or RADAR devices may be given more weight than respective information received from the image-capture device.

In general, as noted above, predetermined map data analysis and dynamically-built (e.g., with live sensor data) map data analysis may be utilized to identify safe or otherwise suitable regions for pullover, in addition to (or alternative to) other methods/factors not described herein. As the computing device identifies the suitable regions, it may build a list of those regions and store them in memory.

It should be understood that the identification of regions and determining left versus right edges/boundaries may be based on a country that the autonomous vehicle is in, such as whether the country the autonomous vehicle is in is a country in which driving on the right side of the road is the norm or whether driving on the left side of the road is the norm. In either case, the computing device can be configured accordingly.

Figure 4A:
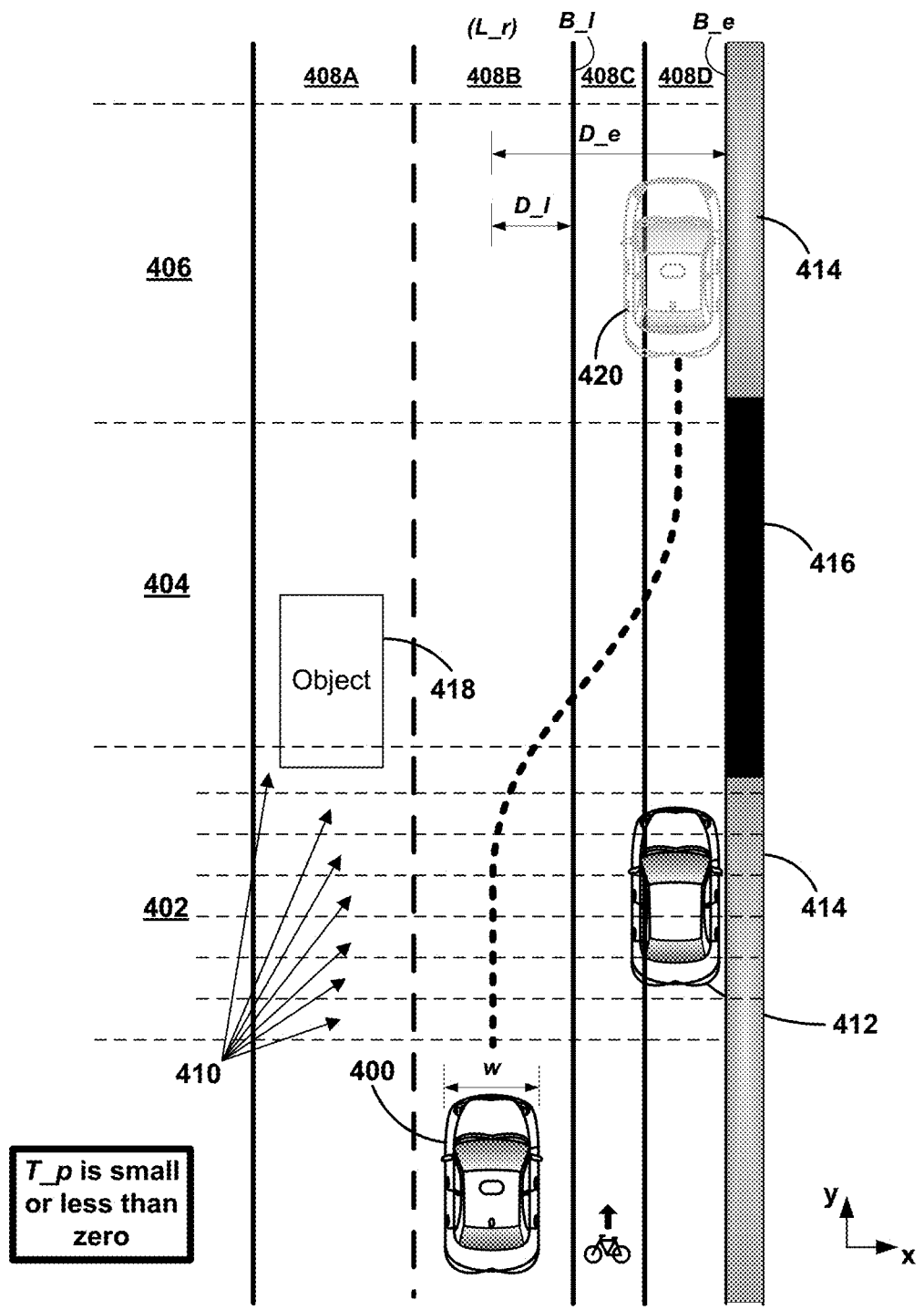
FIG. 4A illustrates aspects of the example method.

FIG. 4A illustrates an example scenario for identifying a region in which to pull over and stop an autonomous vehicle 400. As shown, the autonomous vehicle 400 (e.g., a computing device of the autonomous vehicle), which is travelling in the +y-direction, may encounter an emergency scenario and need to pull over on the side of the road. In FIG. 4A, the computing device of the autonomous vehicle 400 may identify three regions 402-406 ahead of the autonomous vehicle 400 and determine whether the regions 402-406 are safe or otherwise suitable for pulling over and stopping the autonomous vehicle 400, in accordance with the methods and embodiments described above. The road may comprise two main lanes 408A-B, a bicycle lane 408C, and a curb lane 408D.

The computing device may divide each region into chunks, as illustrated by the chunks 410 of region 402, for example. The computing device may first analyze region 402, although the computing device may be configured to analyze other regions prior to or after analyzing region 402. Due to the presence of another vehicle 412 currently parked in the curb lane 408D of region 402 alongside the curb 414 of the road and taking up significant space of region 402, the computing device may determine that region 402 is not suitable for pullover for at least the reason of the other vehicle 412. The computing device may then analyze region 404. In the example shown, the computing device may identify a red curb 416 (e.g., a "no parking zone") as the rightmost boundary of the region 404, and may thus determine that region 404 is not suitable for pullover for at least the reason of the red curb 416. The computing device may also identify an object 418 in region 404 to the left of the autonomous vehicle 400 and in lane 408A. The object 418 may be a static object such as a traffic cone or a wrecked vehicle, or the object 418 may be a dynamic object such as a moving vehicle or other moving object (e.g., travelling in the +y direction). Although the object 418 may not affect the computing device's decision of whether the region 404 is suitable for pullover, in scenarios in which the object 418 is a dynamic object, the computing device may monitor the behavior of the object 418 to determine if the autonomous vehicle 400 may need to avoid the object 418 while in the process of pulling over or while continuing to follow a normal trajectory on the road.

The computing device may then analyze region 406. Moreover, the computing device may analyze region 406 using the method/algorithm described above. As such, the computing device may first identify the rightmost lane (L_r), 408B. The computing device may then obtain, from the predetermined map data, a set of road and lane boundaries (and possibly other boundaries), and identify the boundaries to the right of L_r, including the rightmost boundary (B_l) (e.g., the edge of L_r) as the left edge of the bicycle lane 408C. The computing device may also identify the rightmost boundary which can be considered the edge of the road (B_e) (e.g., the edge where the curb lane 408D meets the curb 414). After identifying B_l and B_e, the computing device may then determine the lateral distance from the center of L_r to B_l (D_l), and the lateral distance from the center of L_r to B_e (D_e). In the example illustrated in FIG. 4A, D_l plus the width of the autonomous vehicle 400 (w) plus a small-valued threshold distance (T_p) (e.g., close to zero or negative in value) is less than D_e, the computing device may determine that the given chunk is suitable for pulling over the autonomous vehicle 400 in region 406. Since region 406 is suitable for pullover, the computing device may then enable the autonomous vehicle 400 to park at location 420 in region 406. It should be understood that the value of T_p may vary based on one or more factors, and in other similar scenarios may be of such a value where region 406 may not be suitable for pullover. It should be also understood that, although not described herein, the computing device may also perform the method/algorithm on regions 402 and 404 as well.

Figure 4B:
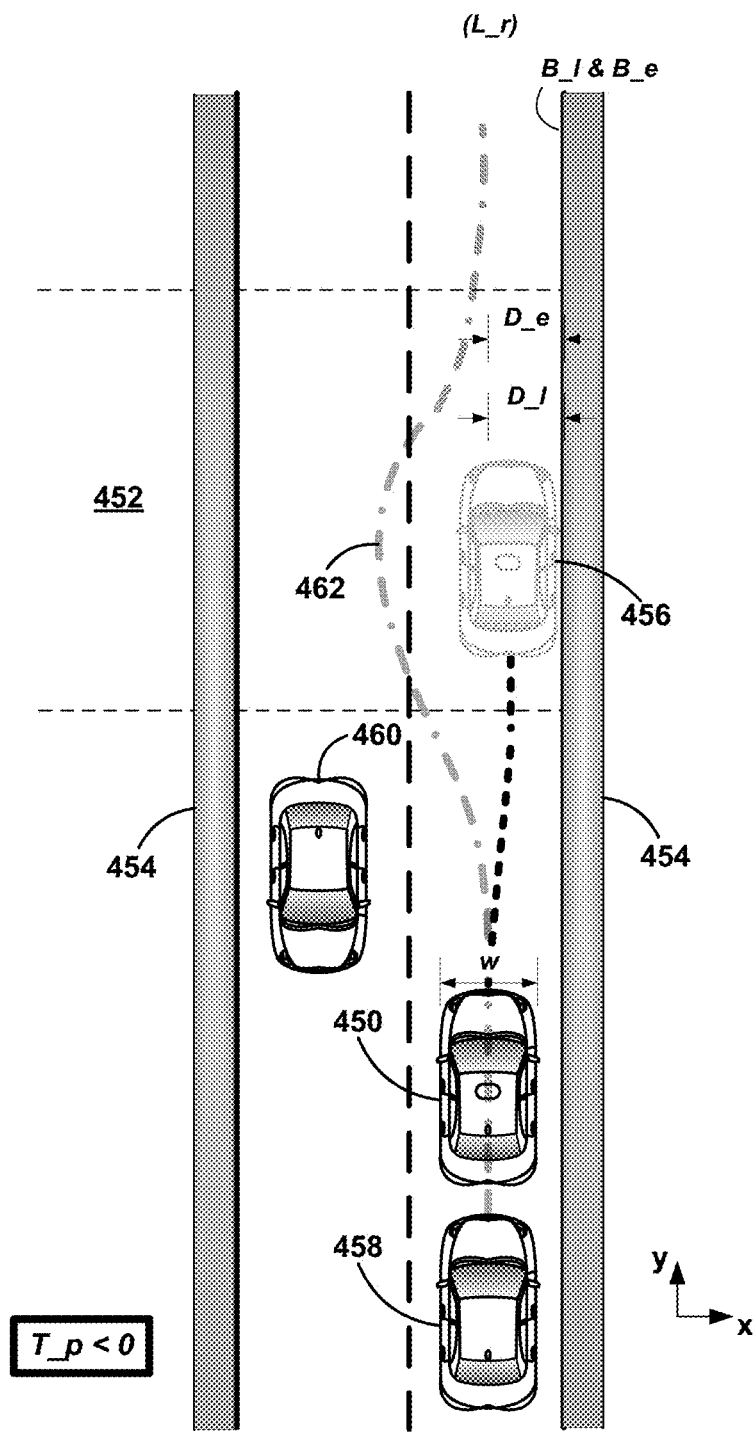
FIG. 4B illustrates further aspects of the example method.

FIG. 4B illustrates another example scenario for identifying a region in which to pull over and stop an autonomous vehicle 450. As shown, the autonomous vehicle 450 (e.g., a computing device of the autonomous vehicle), which is travelling in the +y-direction, may encounter an emergency scenario and need to pull over on the side of the road. In FIG. 4B, the computing device of the autonomous vehicle 450 may identify a region 452 ahead of the autonomous vehicle 450 and determine whether or not the region 452 is safe or otherwise suitable for pulling over and stopping the autonomous vehicle 450, in accordance with the methods and embodiments described above. The road may comprise two lanes between two curbs 454.

The computing device may analyze region 452 and determine that it is suitable for pulling over the autonomous vehicle 450, since D_l plus w plus T_p is less than D_e (D_l is the same as D_e because B_l and B_e are the same boundary). In the example shown, T_p may be negative and may have a magnitude of at least w in order to allow for region 452 to be suitable for pullover. The computing device may then enable the autonomous vehicle 450 to pull over and park at location 456. As shown, the road is a two-way road, and the computing device may identify two objects within the vicinity of the autonomous vehicle 450: vehicle 458 travelling behind the autonomous vehicle 450 in the +y direction and vehicle 460 travelling in the −y direction in a different lane than the autonomous vehicle 450. In this example scenario, the computing device may determine that the road is such that the autonomous vehicle 450 may be able to park in region 452 at location 456 and still leave room for vehicle 458 to safely pass the parked autonomous vehicle 450 along trajectory 462 or a similar trajectory without hitting the autonomous vehicle 450 or taking up too much space of the lane that vehicle 460 is in. Other examples are possible as well.

Referring back to FIG. 3, at block 304, the method 300 includes, based on a speed of the autonomous vehicle and based on the region, determining a braking profile for reducing the speed of the autonomous vehicle while travelling within the region. The braking profile may be determined so as to account for safely controlling the autonomous vehicle while bringing the autonomous vehicle's speed down to zero. For example, pulling over the autonomous vehicle may involve sharp lateral movements, so the braking profile may include a specific lower rate or rates at which to decrease the autonomous vehicle's speed as it moves laterally to avoid control and stability issues that may result from a high rate of deceleration while moving sharply in a given direction. Other examples are also possible. In general, the braking profile may be determined by the computing device so as to quickly navigate the autonomous vehicle off of the road or to a stopping location.

The braking profile may be a function of the autonomous vehicle's current speed. The braking profile may also comprise a plurality of phases, each having a respective duration. The phases may include respective rates at which to reduce the speed of the autonomous vehicle while travelling within the region. During each phase of the braking profile, the computing device may reduce the autonomous vehicle's speed at the respective rate. In some embodiments, the braking profile may include a piecewise linear function associated with the phases. The piecewise linear function may include different line segments representative of the respective rates for each phase. In other embodiments, the braking profile may include one or more of a linear function, a quadratic function, an exponential function, a spline function, and other functions (piecewise and/or non-piecewise). The computing device can also be programmable such that the respective duration of each phase can be predetermined or calibrated prior to the autonomous vehicle performing the example method 300.

In some embodiments, the braking profile may comprise three (or more) phases including a pre-maneuver phase, a maneuver phase which follows the pre-maneuver phase, and a post-maneuver phase which follows the maneuver phase. The pre-maneuver phase may include a low rate of speed reduction (e.g., light braking), and in some examples, the autonomous vehicle may begin to move laterally towards its pullover destination during the pre-maneuver phase. The majority of the lateral movement may be performed during the maneuver phase, which may also include a low rate of speed reduction. The maneuver phase may also not require much longitudinal acceleration while the autonomous vehicle is undergoing the majority of the lateral displacement needed to pull over the autonomous vehicle. The post-maneuver phase may include a high rate of speed reduction (e.g., hard braking). In scenarios where the region includes a location that is adjacent to a main road (e.g., on a shoulder of a highway), the majority or entirety of the post-maneuver phase may be performed while the autonomous vehicle is travelling within that location off the main road. It should be understood, however, that in some examples, the lateral displacement of the autonomous vehicle in the maneuver phase may not be greater than the lateral displacement of the autonomous vehicle in the pre-maneuver and post-maneuver phases. In such examples, the total lateral displacement may be very small or there may be no lateral displacement at all. It should also be understood that in other embodiments not described herein, the braking profile may comprise less than three phases.

In some embodiments, the braking profile may be based on any objects and/or obstacles located within the region and/or outside of the region. For example, the suitable region may be right before a bridge or barrier, so the braking profile may be determined such that the autonomous vehicle can come to a stop before reaching the bridge or barrier. As such, each phase and respective rate may be based on at least a portion of unobstructed drivable space within the region. In other embodiments, the braking profile may be based on detected vehicles within the environment of the autonomous vehicle. For example, such as shown in FIG. 4B, there may be another vehicle travelling behind the autonomous vehicle, and so the braking profile may be determined such that the autonomous vehicle will not brake hard during the pre-maneuver phase and surprise the other vehicle. In general, the autonomous vehicle may adjust its speed based on the behavior of objects in the same or adjacent lanes on the road (e.g., ahead of or behind the autonomous vehicle), such as the example just described, and such as an adjustment made when a nearby vehicle or other dynamic object moves from its current lane to the lane in which the autonomous vehicle is travelling. Other examples are also possible.

At block 306, the method 300 includes, based on the braking profile, determining a trajectory such that the autonomous vehicle will travel within the region while reducing the speed of the autonomous vehicle. The determined trajectory may further be based on information obtained from the region and other identified regions, such as information described with respect to block 302 of the method 300. The determined trajectory may be determined such that the autonomous vehicle will avoid any objects/obstacles within the region (and outside of the region, in some examples) while reducing the speed of the autonomous vehicle in accordance with the braking profile. Further, in some embodiments, the computing device may utilize a conjugate gradient method and/or other methods to optimize the determined trajectory.

In some embodiments, the trajectory may be determined so as to satisfy one or more constraints. The constraints may include minimizing the trajectory's deviation from a normal driving trajectory (e.g., if the autonomous vehicle was to continue driving instead of pulling over) while traveling the distance covered in the pre-maneuver phase of the braking profile. The constraints may also include only driving the autonomous vehicle on the existing road lane(s) or within the region so as to ensure that at no point in time during the pullover the autonomous vehicle travels beyond the road's far edge or other boundary. The constraints may further include the autonomous vehicle performing a minimal amount of steering during the post-maneuver phase as it comes to a complete stop within the region. The constraints may still further include ensuring that the autonomous vehicle slows down to avoid any moving vehicles in front of the autonomous vehicle while travelling along the trajectory. Other constraints are also possible.

Figure 5:
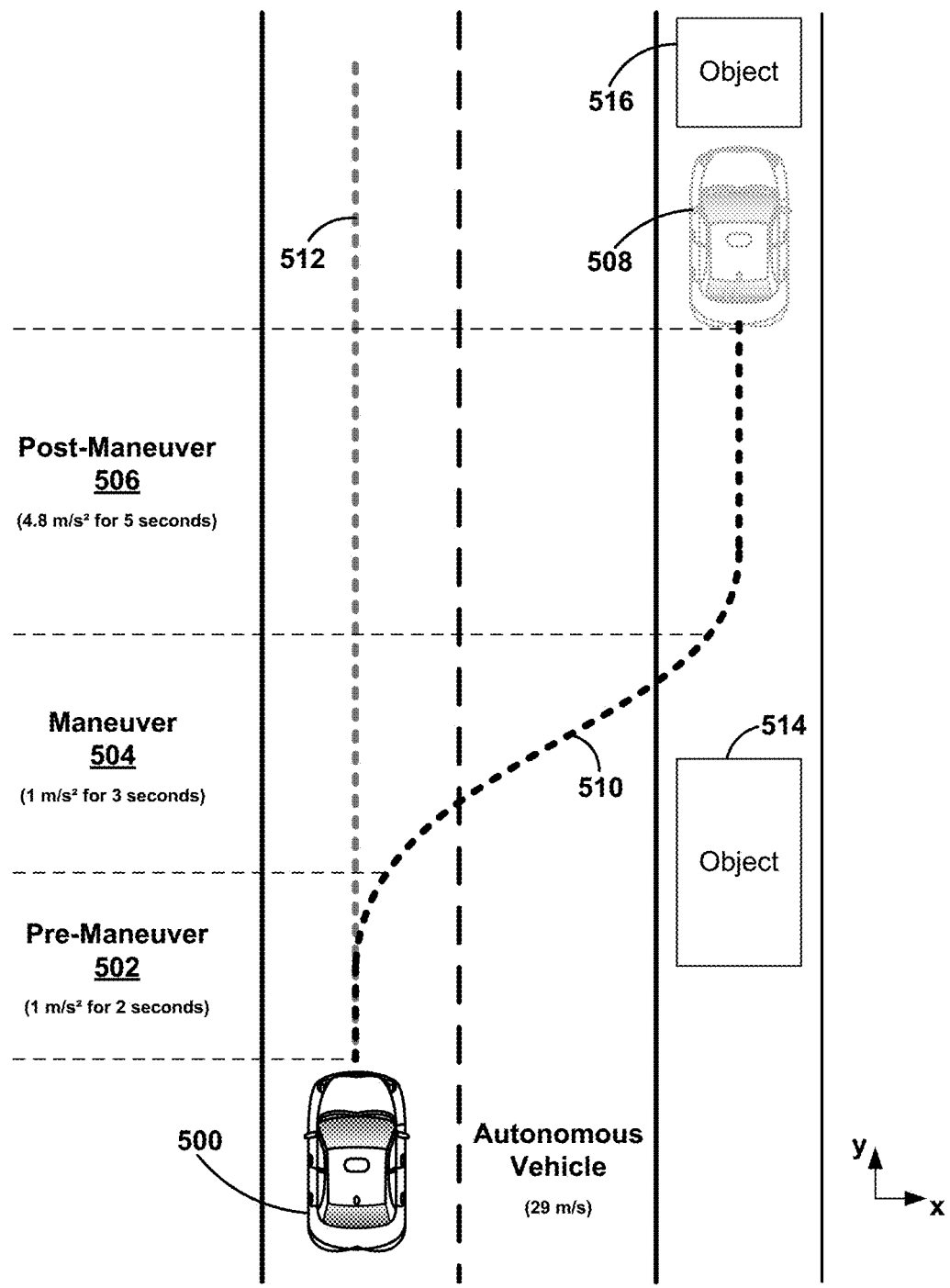
FIG. 5 illustrates still further aspects of the example method.

FIG. 5 illustrates an example scenario for determining a braking profile and a trajectory such that an autonomous vehicle 500 will travel within the region while reducing the speed of the autonomous vehicle 500 in accordance with the braking profile. As shown, the autonomous vehicle 500 (e.g., a computing device of the autonomous vehicle), which is travelling in the +y-direction, may identify a region ahead in which to pull over and stop the autonomous vehicle 500. For the sake of example the autonomous vehicle 500 is shown to be travelling at a current speed of 29 m/s, although other speeds are possible.

The braking profile of the autonomous vehicle 500 may include a pre-maneuver phase 502, a maneuver phase 504, and a post-maneuver phase 506. During the pre-maneuver phase 502, the computing device may be configured to decelerate the autonomous vehicle 500 at a low rate of 1 m/s² for a duration of two seconds, thus bringing the speed of the autonomous vehicle 500 down to 27 m/s by the start of the maneuver phase 504. During the maneuver phase 504, the computing device may be configured to decelerate the autonomous vehicle 500 at a low rate of 1 m/s² for a duration of three seconds, thus bringing the speed of the autonomous vehicle 500 down to 24 m/s by the start of the post-maneuver phase 506. In some embodiments, a low rate of deceleration may be needed during the maneuver phase 504 since the steering and lateral movement of the autonomous vehicle 500 may be largest during this phase. During the post-maneuver phase 506, the computing device may be configured to decelerate the autonomous vehicle 500 at a higher rate of 4.8 m/s² for a duration of five seconds, thus bringing the speed of the autonomous vehicle 500 down to 0 m/s and stopping the autonomous vehicle 500 on the shoulder of the road at location 508, as shown.

The computing device may determine a trajectory 510 for the autonomous vehicle 500 in accordance with the braking profile. However, in some cases, including cases in which no emergency is detected by computing device, the computing device may be configured to instruct the autonomous vehicle 500 to continue along its current trajectory 512 (e.g., default trajectory) rather than follow the trajectory 510 for pulling over in the region. As noted above, the trajectory 510 may include more steering and lateral movement of the autonomous vehicle 500 during the maneuver phase 504. As shown, the trajectory 510 may be determined such that the autonomous vehicle 500 will avoid objects such as object 514 and object 516. In addition, the braking profile may be determined to account for a presence of objects such as object 516 in the autonomous vehicle's 500 pullover region. For instance, if the autonomous vehicle 500 needs to come to a quick stop in the region to avoid colliding with object 516, the braking profile may be determined such that the post-maneuver phase 506 includes hard braking (e.g., 4.8 m/s² for five seconds, as shown, or 8 m/s² for three seconds, for harder braking, etc.).

The example scenario of FIG. 5 illustrates a braking profile that may be determined based on a high initial (e.g., current) speed of the autonomous vehicle 500. It should be understood that at low speeds, various aspects of the braking profile and the determined trajectory may change. For example, at low speeds, the duration of the pre-maneuver phase 502 may be reduced and the rate of deceleration during the post-maneuver phase 506 may be substantially reduced, which may cause the autonomous vehicle 500 to stop smoothly. Other examples are also possible.

Referring back to FIG. 3, at block 308, the method 300 includes determining, by the computing device (or other device configured to control the autonomous vehicle), instructions for pulling over and stopping the autonomous vehicle in the region in accordance with the determined trajectory. Further, at block 310, the method 300 includes storing the instructions in a memory accessible by the computing device. As such, the computing device may be configured to receive information indicative of a request or requirement to access and execute the instructions so as to pull over and stop the autonomous vehicle.

The computing device may be configured to receive, from sensors and devices coupled to the autonomous vehicle (e.g., via one or more signals), information associated with, for example, condition of systems and subsystems of the autonomous vehicle, such as sensor systems and other systems and subsystems. For example, information indicating that the autonomous vehicle is about to run out of gas or information that an important sensor of the autonomous vehicle has failed may be taken into account by the computing device in determining whether to access and execute the instructions to pull over and stop the autonomous vehicle. As another example, the computing device may encounter/detect a scenario (of the road ahead and/or of the autonomous vehicle's systems) that it does not know how to handle, and thus the computing device may then determine that the autonomous vehicle needs to be pulled over. Other examples are also possible. Further, the computing device may be configured to receive information from a remote operator indicative of a request to pull over and stop the autonomous vehicle in accordance with the region, braking profile, trajectory, and instructions stored in the memory.

Still further, the computing device may be configured to receive a manual command/instruction (e.g., via a button or switch located inside the autonomous vehicle) for the computing device to access and execute the instructions for pulling over the autonomous vehicle. The manual instruction may be received by a driver of the autonomous vehicle or other person(s), and upon execution of the In some embodiments, after detecting an emergency scenario, the computing device may be configured to provide the driver of the autonomous vehicle a window of time during which the driver can take over manual control of the autonomous vehicle to either pull over the autonomous vehicle or continue driving, based on whether the driver deems it necessary to pull over the autonomous vehicle or not.

The computing device may be configured to receive information associated with the surrounding environment of the autonomous vehicle, such as driving conditions and road conditions (e.g., rain, snow, etc.). For example, information indicating that the road is icy or wet ahead of the vehicle may be taken into account by the computing device in determining a region, braking profile, and/or trajectory to pull over and stop the autonomous vehicle, and determining whether to access and execute the instructions to pull over and stop the autonomous vehicle. Other examples are also possible.

While the computing device may be configured to periodically determine the region, braking profile, trajectory, and instructions for pulling over and stopping the autonomous vehicle, the computing device may also be configured to periodically or continuously determine default instructions for maintaining a current trajectory of the autonomous vehicle (e.g., current trajectory of 512 of FIG. 5) and maintaining the speed of the autonomous vehicle so as to not pull over and stop the autonomous vehicle. The default instructions may also be stored in memory accessible by the computing device. In some embodiments, at a given point in time, the computing device may be configured to execute the default instructions unless an emergency scenario is detected (e.g., a failure of one or more systems of the autonomous vehicle and/or of the computing device itself) and/or a manual override command is received, causing the computing device to access and execute the instructions to pull over and stop the autonomous vehicle and divert from the current trajectory.

In some embodiments, after executing instructions to pull over and stop the autonomous vehicle, the computing device may be configured to switch back to the current trajectory if the computing device determines that the emergency scenario is no longer present, if the computing device determined the emergency scenario in error, and/or if the driver mistakenly directed the computing device to execute the instructions, among other possibilities. In such embodiments, the computing device may instruct the autonomous vehicle to switch back to the current trajectory automatically, or the driver may be enabled to either manually switch to the current trajectory or take control of the vehicle (e.g., speed and steering control).

The decision made by the computing device (e.g., one or more modules of the computing device) to access and execute the instructions to pull over the autonomous vehicle can be determined at the same module of the computing device that is configured to determine the pullover trajectory, or can be determined at a different module. For example, if information associated with both the pullover trajectory and the current trajectory is accessible by a lower-level module (e.g., a controller responsible for actuating the throttle/brakes and steering), the lower-level module can be configured to make the decision of whether or not to execute the instructions to pull over the autonomous vehicle. In this case, the lower-level module may be configured to utilize heuristics relating to determining whether a high-level module responsible for determining the current trajectory has failed and if the high-level module has not determined/stored a new current trajectory in a particular amount of time (e.g., the high-level module has stopped continuously determining the current trajectory). The heuristics may also relate to determining how recently the pullover trajectory was generated and determining if the pullover trajectory is no longer suitable/valid for use (e.g., based on changing conditions of the road, or other factors). Other heuristics are also possible.

Executing the instructions to either continue along the current trajectory or pull over and stop the autonomous vehicle may involve executing the instructions in accordance with one or more control strategies. The control system of the autonomous vehicle may comprise multiple control strategies that may be predetermined or adaptive to changes in a driving environment of the autonomous vehicle, the driving environment including the predicted actions of objects substantially in front of the autonomous vehicle, behind the autonomous vehicle, and/or to the side of the autonomous vehicle. Generally, a control strategy may comprise sets of instructions or rules associated with traffic interaction in various driving contexts. The control strategy, for example, may comprise rules that determine a speed of the autonomous vehicle, steering angle, and a lane that the autonomous vehicle may travel on while taking into account safety and traffic rules and concerns (e.g., other vehicles stopped at an intersection and windows-of-opportunity in yield situation, lane tracking, speed control, distance from other vehicles on the road, passing other vehicles, and queuing in stop-and-go traffic, and avoiding areas that may result in unsafe behavior such as oncoming-traffic lanes, etc.). For instance, the computing device may be configured to determine, based on the identified region, the braking profile, the determined trajectory, and the instructions of blocks 302-310, respectively, a control strategy comprising rules for actions that control speed, steering angle, and lane of the autonomous vehicle. Further, a given control strategy (or multiple strategies) may comprise a program or computer instructions that characterize actuators controlling the autonomous vehicle (e.g., throttle, steering gear, brake, accelerator, or transmission shifter).

In some examples, the instructions provided by the computing device to adjust the control of the autonomous vehicle (e.g., speed, steering, etc.) may be based on road geometry, such as if the road is straight, curving slightly, curving sharply, etc.

As noted above, the computing device may be configured to periodically perform the methods disclosed herein. During a given "cycle" of the method, the given cycle comprising identifying the region of the road, determining the braking profile, determining the trajectory, determining the instructions, and storing the instructions, for example, the computing device may be configured to reuse at least a portion of the data stored in memory from one or more previous cycles. For example, a pullover trajectory determined during a given cycle may be based at least in part on a pullover trajectory determined during a cycle prior to the given cycle. As another example, information associated with the road ahead of the autonomous vehicle such as road boundary information (e.g., $D\_l$ and $D\_e$) may not change from one cycle to the next, so the computing device may use the same road boundary information in sequential cycles (e.g., if the values of D_l and D_e have not changed since the previous cycle). Other examples of reusing data are also possible.

In some embodiments, the disclosed methods may be implemented as computer program instructions encoded on a computer-readable storage media in a machine-readable format, or on other non-transitory media or articles of manufacture. FIG. 6 is a schematic illustrating a conceptual partial view of an example computer program product 600 that includes a computer program for executing a computer process on a computing device, arranged according to at least some embodiments presented herein. In one embodiment, the example computer program product 600 is provided using a signal bearing medium 601. The signal bearing medium 601 may include one or more program instructions 602 that, when executed by one or more processors (e.g., processor 113 in the computing device 111) may provide functionality or portions of the functionality described above with respect to FIGS. 1-5. Thus, for example, referring to the embodiments shown in FIG. 3, one or more features of blocks 302-310 may be undertaken by one or more instructions associated with the signal bearing medium 601. In addition, the program instructions 602 in FIG. 6 describe example instructions as well.

In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming to the IEEE 802.11 standard or other transmission protocol).

The one or more programming instructions 602 may be, for example, computer executable and/or logic implemented instructions. In some examples, a computing device such as the computing device described with respect to FIGS. 1-5 may be configured to provide various operations, functions, or actions in response to the programming instructions 602 conveyed to the computing device by one or more of the computer readable medium 603, the computer recordable medium 604, and/or the communications medium 605. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method performed by a computing system configured to control an autonomous vehicle, the method comprising:
    receiving, by at least one processor of the computing system, and from one or more sensors in communication with the computing system, sensor data indicative of a region of a road of travel ahead of the autonomous vehicle;
    based on the sensor data, the at least one processor selecting the region to be a region in which to pull over and stop the autonomous vehicle;
    based on a speed of the autonomous vehicle and based on the region, determining, by the at least one processor, a braking profile for reducing the speed of the autonomous vehicle while travelling within the region;
    based on the braking profile, determining, by the at least one processor, a trajectory the autonomous vehicle navigates within the region while reducing the speed of the autonomous vehicle in accordance with the braking profile;
    the at least one processor periodically determining up-to-date instructions to cause the autonomous vehicle to pull over and stop during travel as an environment of the autonomous vehicle changes and storing the up-to-date instructions in a memory of the computing system accessible by the at least one processor; and
    based on the stored up-to-date instructions, the computing system causing the autonomous vehicle to pull over and stop in the region while navigating along the trajectory and reducing the speed of the autonomous vehicle in accordance with the braking profile.

2. The method of claim 1, wherein determining the braking profile comprises:
    determining a plurality of phases during which the autonomous vehicle will reduce the speed of the autonomous vehicle, pull over, and stop in the region;
    determining, for each phase of the plurality of phases, a respective rate at which to reduce the speed of the autonomous vehicle while travelling within the region during the phase; and
    determining, for each phase of the plurality of phases, a respective lateral displacement the autonomous vehicle navigates within the region during the phase.

3. The method of claim 1, further comprising:
    periodically determining, by the at least one processor, as the environment of the autonomous vehicle changes, up-to-date default instructions for maintaining a current trajectory of the autonomous vehicle and maintaining the speed of the autonomous vehicle so as to not pull over and stop the autonomous vehicle; and
    the at least one processor storing the up-to-date default instructions in the memory accessible by the at least one processor.

4. The method of claim 1, further comprising:
    receiving, by the at least one processor, information indicative of a failure of one or more systems of the autonomous vehicle; and
    in response to receiving the information indicative of the failure of the one or more systems of the autonomous vehicle, and based on the stored up-to-date instructions, the at least one processor causing the autonomous vehicle to pull over and stop in the region while navigating along the trajectory and reducing the speed of the autonomous vehicle in accordance with the braking profile.

5. The method of claim 1, wherein the stored up-to-date instructions include instructions to adjust a steering angle of the autonomous vehicle so as to navigate the determined trajectory.

6. The method of claim 1, wherein selecting the region to be a region in which to pull over and stop the autonomous vehicle comprises:
   based on the sensor data, making a determination of whether a distance from a center of a rightmost lane in the region to a rightmost boundary of the rightmost lane plus a width of the autonomous vehicle plus a predetermined threshold distance is less than a distance from the center of the rightmost lane to the rightmost edge of the road, and
   selecting the region to be the region in which to pull over and stop the autonomous vehicle in response to the determination being that the distance from the center of the rightmost lane to the rightmost boundary of the rightmost lane plus the width of the autonomous vehicle plus the predetermined threshold distance is less than the distance from the center of the rightmost lane to the rightmost edge of the road.

7. The method of claim 6, further comprising:
   determining the predetermined threshold distance based on one or more of: a boundary type of the rightmost boundary, a width of the road, and a speed limit of the road.

8. A system comprising:
   at least one processor; and
   a memory having stored thereon instructions that, upon execution by the at least one processor, cause the system to perform functions comprising:
      receiving, from one or more sensors coupled to the autonomous vehicle, sensor data indicative of a region of a road of travel ahead of the autonomous vehicle;
      based on the sensor data, selecting the region to be a region in which to pull over and stop the autonomous vehicle;
      based on a speed of the autonomous vehicle and based on the region, determining a braking profile for reducing the speed of the autonomous vehicle while travelling within the region;
      based on the braking profile, determining a trajectory the autonomous vehicle navigates within the region while reducing the speed of the autonomous vehicle in accordance with the braking profile;
      determining instructions for causing the autonomous vehicle to pull over and stop in the region while navigating along the trajectory and reducing the speed of the autonomous vehicle in accordance with the braking profile;
      periodically determining up-to-date instructions to cause the autonomous vehicle to pull over and stop during travel as an environment of the autonomous vehicle changes and storing the up-to-date instructions in the memory accessible and executable by the at least one processor; and
      based on the stored up-to-date instructions, causing the autonomous vehicle to pull over and stop in the region while navigating along the trajectory and reducing the speed of the autonomous vehicle in accordance with the braking profile.

9. The system of claim 8, wherein the braking profile comprises a plurality of phases including respective rates at which to reduce the speed of the autonomous vehicle while travelling within the region, and wherein the braking profile includes a piecewise linear function associated with the plurality of phases and representative of the respective rates.

10. The system of claim 8, wherein determining the braking profile comprises:
    determining a plurality of phases including a first phase, a second phase following the first phase, and a third phase following the second phase;
    determining, for each phase of the plurality of phases, a respective rate at which to reduce the speed of the autonomous vehicle while travelling within the region; and
    determining respective lateral displacements the autonomous vehicle navigates within the region during the plurality of phases, wherein the lateral displacement of the autonomous vehicle during the second phase is at least equal to the lateral displacement of the autonomous vehicle during the first phase and the lateral displacement of the autonomous vehicle during the third phase, and wherein the respective rate of the third phase is greater than the respective rates of the first phase and the second phase.

11. The system of claim 10, wherein the sensor data is further indicative of one or more objects ahead of the autonomous vehicle on the road, and wherein determining the braking profile comprises determining the respective rates and lateral displacements of the first, second, and third phases based on the one or more objects such that the autonomous vehicle will avoid the one or more objects within the region while reducing the speed of the autonomous vehicle in accordance with the braking profile.

12. The system of claim 11, wherein determining the trajectory comprises determining a trajectory the autonomous vehicle navigates within the region while avoiding the one or more objects within the region and while reducing the speed of the autonomous vehicle in accordance with the braking profile.

13. A method performed by a computing system configured to control an autonomous vehicle, the method comprising:
    while the autonomous vehicle is travelling on a road along a trajectory at a speed and while an environment of the autonomous vehicle changes, at least one processor of the computing system (i) determining up-to-date instructions to cause the autonomous vehicle to pull over and stop during travel and (ii) storing the up-to-date instructions in a memory of the computing system accessible by the at least one processor, wherein determining and storing the up-to-date instructions comprises:
       the at least one processor selecting a suitable region of the road ahead of an autonomous vehicle to be an up-to-date region in which to pull over and stop the autonomous vehicle;
       based on the speed of the autonomous vehicle and based on the up-to-date region, the at least one processor determining a braking profile corresponding to the up-to-date region, the braking profile being for reducing the speed of the autonomous vehicle while travelling within the up-to-date region; and
       based on the braking profile, the at least one processor (i) determining the up-to-date instructions for causing the autonomous vehicle to pull over and stop in the up-to-date region while navigating along an adjusted trajectory and reducing the speed of the autonomous vehicle in accordance with the braking profile corresponding to the up-to-date region, and (ii) storing the up-to-date instructions in the memory; and based on the stored up-to-date instructions, the computing system causing the autonomous vehicle to pull over and stop in the up-to-date region while navigating along the adjusted trajectory and reducing the speed of the autonomous vehicle in accordance with the braking profile corresponding to the up-to-date region.

14. The method of claim 13, wherein selecting a suitable region of the road ahead of an autonomous vehicle to be an up-to-date region in which to pull over and stop the autonomous vehicle comprises:

receiving sensor data indicating, for a region of the road, one or more lane boundaries of the road and further indicating one or more road boundaries of the road;

determining a first distance between the autonomous vehicle and the one or more lane boundaries;

determining a second distance between the autonomous vehicle and the one or more road boundaries;

making a comparison of the first and second distances to a predetermined threshold distance and to a size of the autonomous vehicle; and based on the comparison, selecting the region to be the up-to-date region in which to pull over and stop the autonomous vehicle.

15. The method of claim 14, further comprising:

before making the comparison, the at least one processor:
receiving sensor data that indicates a speed limit of the road; and
based on the sensor data that indicates the speed limit of the road, adjusting the predetermined threshold distance, wherein making the comparison of the first and second distances to the predetermined threshold distance and to the size of the autonomous vehicle comprises making the comparison of the first and second distances to the adjusted predetermined threshold distance and to the size of the autonomous vehicle.

16. The method of claim 14, further comprising:

before making the comparison, the at least one processor:
based on predetermined map data of the road stored in the memory, determining a width of the road in the region; and
based on the width of the road in the region, adjusting the predetermined threshold distance, wherein making the comparison of the first and second distances to the predetermined threshold distance and to the size of the autonomous vehicle comprises making the comparison of the first and second distances to the adjusted predetermined threshold distance and to the size of the autonomous vehicle.

17. A system comprising:

at least one processor; and
a memory having stored thereon instructions that, upon execution by the at least one processor, cause the system to perform functions comprising:

while the autonomous vehicle is travelling on a road along a trajectory at a speed and while an environment of the autonomous vehicle changes, (i) determining up-to-date instructions to cause the autonomous vehicle to pull over and stop during travel and (ii) storing the up-to-date instructions in the memory accessible by the at least one processor, wherein determining and storing the up-to-date instructions comprises:

selecting a suitable region of the road ahead of an autonomous vehicle to be an up-to-date region in which to pull over and stop the autonomous vehicle, based on the speed of the autonomous vehicle and based on the up-to-date region, determining a braking profile corresponding to the up-to-date region, the braking profile being for reducing the speed of the autonomous vehicle while travelling within the up-to-date region, and based on the braking profile, (i) determining the up-to-date instructions for causing the autonomous vehicle to pull over and stop in the up-to-date region while navigating along an adjusted trajectory and reducing the speed of the autonomous vehicle in accordance with the braking profile corresponding to the up-to-date region, and (ii) storing the up-to-date instructions in the memory accessible by the at least one processor; and based on the stored up-to-date instructions, causing the autonomous vehicle to pull over and stop in the up-to-date region while navigating along the adjusted trajectory and reducing the speed of the autonomous vehicle in accordance with the braking profile corresponding to the up-to-date region.

18. The system of claim 17, wherein determining and storing the up-to-date instructions comprises periodically determining and storing the up-to-date instructions.

19. The system of claim 17, the functions further comprising:

receiving information indicative of a failure of one or more systems of the autonomous vehicle; and in response to receiving the information indicative of the failure of the one or more systems of the autonomous vehicle, and based on the stored up-to-date instructions, causing the autonomous vehicle to pull over and stop in the region while navigating along the trajectory and reducing the speed of the autonomous vehicle in accordance with the braking profile.

20. The system of claim 17, wherein the braking profile includes a plurality of phases, wherein each phase of the plurality of phases has a respective rate at which to reduce the speed of the autonomous vehicle, and wherein the braking profile includes a piecewise linear function associated with the plurality of phases and representative of the respective rates.

* * * * *